United States Patent
Reuss et al.

(10) Patent No.: US 12,318,936 B2
(45) Date of Patent: Jun. 3, 2025

(54) METHOD FOR DETERMINING A TORQUE FOR AN OPERATION OF A ROBOT USING A MODEL AND METHOD FOR TEACHING THE MODEL

(71) Applicant: Robert Bosch GmbH, Stuttgart (DE)

(72) Inventors: Moritz Reuss, Neckarsulm (DE); Niels Van Duijkeren, Kornwestheim (DE); Robert Krug, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 230 days.

(21) Appl. No.: 18/319,989

(22) Filed: May 18, 2023

(65) Prior Publication Data
US 2024/0066692 A1    Feb. 29, 2024

(30) Foreign Application Priority Data
May 19, 2022    (DE) ...................... 10 2022 205 011.8

(51) Int. Cl.
*B25J 9/16*    (2006.01)
*B25J 13/08*    (2006.01)

(52) U.S. Cl.
CPC .......... *B25J 9/1633* (2013.01); *B25J 9/1607* (2013.01); *B25J 9/161* (2013.01); *B25J 9/163* (2013.01); *B25J 13/085* (2013.01); *B25J 13/088* (2013.01)

(58) Field of Classification Search
CPC ........ B25J 9/1633; B25J 9/1607; B25J 9/161; B25J 9/163; B25J 13/085; B25J 13/088;
(Continued)

(56) References Cited

U.S. PATENT DOCUMENTS

2019/0275674 A1*    9/2019    Yamamoto ............. B25J 9/1638
2020/0055680 A1*    2/2020    Chavan Dafle ...... B25J 15/0004
(Continued)

FOREIGN PATENT DOCUMENTS

DE    102004056861 A1    6/2006
DE    102006055917 A1    6/2008
(Continued)

OTHER PUBLICATIONS

Sousa et al. "Physical feasibility of robot base inertial parameter idenfication: A linear matrix inequality approach" The International Journal of Robotics Research (2014); pp. 931-944.
(Continued)

*Primary Examiner* — Masud Ahmed
(74) *Attorney, Agent, or Firm* — NORTON ROSE FULBRIGHT US LLP (57) ABSTRACT

A method for determining a torque for an operation of a robot that includes multiple components, using a model of the robot. Two components of the robot being movable using an actuator relative to one another at a connection point. The model maps parameters for the connection points onto a torque for the respective actuator. The method includes: providing values for the parameters including: a position or an angle a velocity, and an acceleration of the respective actuator; determining a value for the rigid body partial torque, the friction partial torque, and the machine learning partial torque, based on the values of the parameters and the model; determining a value of the torque of the respective actuator based on the values of the partial torques, and providing the value of the torque for the respective actuator for use during the operation, control or regulating of the robot.

13 Claims, 4 Drawing Sheets

(58) Field of Classification Search
CPC ..... B25J 9/1605; G06F 30/17; G06F 2111/10; G06F 30/27; G06N 3/0455; G06N 3/0442; G06N 3/008; G06N 3/08; G05B 2219/40499
See application file for complete search history.

(56) References Cited

U.S. PATENT DOCUMENTS

| | | | |
|---|---|---|---|
| 2022/0233271 A1* | 7/2022 | Peine | B25J 9/1633 |
| 2022/0324116 A1* | 10/2022 | Reading | B25J 9/1653 |
| 2023/0052996 A1* | 2/2023 | Thomsen | B25J 9/1653 |

FOREIGN PATENT DOCUMENTS

| | | |
|---|---|---|
| DE | 102007024143 A1 | 11/2008 |
| DE | 102004064297 B3 | 5/2016 |
| DE | 102017005043 A1 | 12/2017 |
| DE | 102019112611 B3 | 10/2020 |
| DE | 102020114583 A1 | 1/2021 |
| DE | 112017008018 B4 | 3/2021 |
| DE | 112020004135 T5 | 6/2022 |
| DE | 102021112485 B3 | 8/2022 |

OTHER PUBLICATIONS

Sousa et al. "Initeria Tensor Properties in Robot Dynamics Identification: A Linear Matrix Inequality Appraoch" IEEE Transactions on Mechatronics (2019); pp. 1-6.

Shaj et al. "Action-Conditional Recurrent KIman Networks for Forward and Inverse Dynamics Learning" arXiv (2020); pp. 1-17.

* cited by examiner

METHOD FOR DETERMINING A TORQUE FOR AN OPERATION OF A ROBOT USING A MODEL AND METHOD FOR TEACHING THE MODEL

FIELD

The present invention relates to a method for determining a torque for an operation of a robot that includes multiple components using a model of the robot, the robot including one or multiple actuators, two components each of the robot being movable with the aid of an actuator relative to one another at a connection point, to a method for teaching such a model, and to a system, to a robot, and to a computer program for carrying out the above.

BACKGROUND INFORMATION

Robots may be used for various applications. For this purpose, a robot may include multiple components, two components each being movable with the aid of an actuator relative to one another at a connection point such as, for example, at a joint. In this way, it is possible, for example, to move a manipulator at a robot or at an end of a robotic arm. To operate such a robot, the actuators must be activated in a targeted manner.

SUMMARY

According to the present invention, a method for determining a torque for an operation of a robot using a model and a method for teaching the model, as well as a system, a robot and a computer program for carrying out the method(s) are provided. Advantageous embodiments of the present invention are disclosed herein.

The present invention involves robots as they are used for various applications, for example, in the manufacture of various small or large components or in other tasks that are to be automated. For this purpose, a robot may include, for example, a robotic arm including a manipulator at the end thereof. With the aid of the manipulator, it is possible, for example, to grasp parts and to transport them to another position. Work processes, for example, may also be carried out such as, for example, inserting screws at multiple positions. For this purpose, the manipulator (then with a screwing tool) may be moved to the respective positions of the screws. Further examples are, for example, the insertion of a plug at a cable, in which a socket on a circuit board may easily break, or the insertion of a shaft into a bearing, a small misalignment being capable of causing strong reaction forces.

In order for such a robot to be able to carry out corresponding movements, in particular of the manipulator, the robot includes multiple components, two components of a connection point such as, for example, a joint, each being movable relative to one another with the aid of an actuator. For example, five, seven or even more such joints and corresponding actuators may be provided depending on the type of robot. Actuators to be considered include, for example, electric motors, optionally including gears, in order to be able to effect a corresponding rotation. In addition to joints, translational connection points may, however, also be considered, in such case, for example, including linear motors as actuators. The present invention, however, is explained below, in particular, with reference to joints as connection points.

For the proper operation of such a robot, setpoint values to be achieved by the individual components may be pre-defined, for example, in an acceleration space in order, for example, to move the manipulator into a particular position. This ultimately results in setpoint values for torque rates or torques for the actuators that must be applied.

In this context, reference may also be made to so-called inverse dynamics. To be able to determine such torques, it is possible to resort to a model, which maps parameters for the one or for at least one of multiple connection points onto a torque for the respective actuator.

According to an example embodiment of the present invention, the use of a precise inverse model of the robot dynamics could reduce the dependency on a feedback control or feedback regulation for the tracking accuracy. The use of a feed-forward compensator would enable a simultaneously flexible and precise tracking. One aim of such inverse dynamics or their modeling is, in particular, to map parameters of the connection points as exactly as possible onto a torque for the respective actuator in order to ultimately be able to adjust the torque in such a way that a desired acceleration (setpoint value) is achieved.

According to an example embodiment of the present invention, one possible model in this case is based on a rigid body model (or also a rigid body dynamics model), or is such a model. If (only) one such model is used which is potentially inaccurate, this may result in stiff movements during the activation or regulation of the robot in order to compensate for the inaccuracies; the robot would, for example, not decelerate when contacting an obstacle in its path. For humans in particular, there is a significant risk of injury in such case. Moreover, it has been found that, for example, friction, i.e., friction forces occurring during the movement of the robot or of the components relative to one another, are unable or at least not fully able to be taken into consideration in the rigid body model. However, even taking the friction, in addition to the rigid body model, into account fails to result in a sufficiently "soft" movement, as has been shown.

According to an example embodiment of the present invention, use of a model is provided, which includes a rigid body model, a friction model and, in addition, a machine learning model (or is based on these three sub-models). Thus, this involves a multi-part model or a hybrid model. Parameters for the one or the multiple connection points to be used are considered in this case to be position or an angle, a velocity, and an acceleration of the respective actuator. In the case of a joint as the connection point, the angle as the parameter is advantageous, whereas in the case of a linear connection point, the position, velocity and acceleration are then potentially angular velocity and angular acceleration.

According to an example embodiment of the present invention, the rigid body model in this case maps at least one of the parameters onto a rigid body partial torque of the respective actuator. Such a rigid body model in this case is based, in particular, on non-linear movement equations. The dynamics are linear in the inertia parameters. Differential equations for the robot dynamics are non-linear in the angles and velocities. For purpose of illustration, a canonical formula reads, for example, as $$\tau := M(q)\ddot{q} + C(q,\dot{q})\dot{q} + g(q)$$

the functions M, C and g being non-linear and also being multiplied by $\ddot{q}$ and $\dot{q}$. It is advantageous in this case if the rigid body model is parameterized with the aid of barycentric parameters, the barycentric parameters including, in particular, a zero order inertia parameter, for example, the mass, first order inertia parameter, for example, the position of the mass center (the position multiplied by the mass), and second order inertia parameter, for example, a 3×3 matrix (including six individual entries) of the so-called inertia sensor. The rigid body partial torque $\tau_{RBD}$ may then be represented as follows:

$$\tau_{RBD} := Y(q,\dot{q},\ddot{q})\pi$$

In this case, $Y(q,\dot{q},\ddot{q})$ is a matrix, which is a function only of the kinematic properties of the robot. This does not change the above formula for $\tau$ and its non-linearity. In addition, $\pi$ indicates the barycentric parameters (according to the above explanation with ten entries for each connection point). The angle, the velocity as well as the acceleration are identified with $q,\dot{q},\ddot{q}$. This may also involve vectors in each case, including in each case one entry per actuator. Such a parameterization is described in greater detail, for example, in Sousa, C. D. & Cortesão, R. (2014); "Physical feasibility of robot base inertial parameter identification. A linear matrix inequality approach;" The International Journal of Robotics Research, 931-944. The parameters mapped by the rigid body model onto the rigid body partial torque of the respective actuator are in this case, in particular, position or angle, velocity, and acceleration. This barycentric parameterization may, however, also be used for translational connection points.

According to an example embodiment of the present invention, the friction model maps at least one of the parameters, in particular, the velocity, onto a friction partial torque of the respective actuator. The friction model in this case may be based on a Coulomb friction coefficient and/or on a viscosity friction coefficient. The friction partial torque $\tau_C$ may be represented as a simple choice, for example, as follows:

$$\tau_C := \begin{cases} \sigma_{C,i} \cdot \text{sign}(\dot{q}_i) + \sigma_{O,i} + \sigma_{V,i}\dot{q}_i & \text{if } |\dot{q}_i| > v_{\epsilon,i} \\ \dfrac{\sigma_{C<i}}{V_{\epsilon,i}}\dot{q}_i + \sigma_{O,i} + \sigma_{V,i}\dot{q}_i & \text{otherwise} \end{cases}$$

In this case, $\sigma_{C,i}$ indicates the Coulomb friction coefficient for the ith actuator, $\sigma_{O,i}$ indicates a model asymmetry for the ith actuator and $\sigma_{V,i}$ indicates the viscosity friction coefficient for the ith actuator, the velocity range for the ith actuator, in which the friction function is increasing in order to avoid a discontinuity, is identified with $v_{\epsilon,i}$. For a given $\sigma_{V,i}$, the friction parameters above the velocity range are linear in parameters $\sigma_{C,i}$, $\sigma_{O,i}$ and a $\sigma_{V,i}$ and may therefore be included in the identification of the inertia parameters. It is understood that other friction models may also be used, thus, for example, the components $\sigma_{O,i}$ (model asymmetry) and $\sigma_{V,i}$ (viscosity friction coefficients) may be omitted in the above model (then only Coulomb friction).

In addition to the two aforementioned sub-models, rigid body model and friction model, there is now also the machine learning model. The inventors have found that a significantly improved and more exact activation or regulation of the robot may be achieved as a result. The machine learning model maps at least one of the parameters onto a machine learning partial torque of the respective actuator. The machine learning model preferably includes an artificial neural network, preferably a multi-layer neural network, further preferably an LSTM neural network. The machine learning model may, however, also include, for example, an action-conditional recurrent Kalman network. The parameters mapped by the machine learning model onto the machine learning partial torque of the respective actuator are in this case, in particular, position or angle, velocity, and acceleration.

As has been shown, a residual torque contribution may be taken into consideration via such a machine learning model, which is mapped neither via the rigid body model nor by the friction model and, in particular, is, for example, also not or at least not completely observable. This may be due, for example, to complex friction effects or to a certain flexibility of the connection points. The machine learning partial torque may be identified in the case of the LSTM neural network, for example, with $\tau_{LSTM}$. LSTM in this case stands for "long short-term memory."

Values for the parameters, which are required in the individual sub-models, may then be provided for the operation of the robot, specifically, for each of the required actuators. Based on the values of the parameters and the model, a value of the rigid body partial torque, of the friction partial torque and of the machine learning partial torque, respectively, is then determined. Based on these individual values, a value of the torque $\tau_H$ of the respective actuator is then determined, specifically, for example, according to $$\tau_H = \tau_{RBD} + \tau_C + \tau_{LSTM}$$

The value of the torque for the respective actuator is then provided for use during the operation of the robot. Control variables and/or regulating variables for the robot are preferably also determined, specifically, based on values of the torque for the respective actuator. These control variables and/or regulating variables are then provided for the operation of the robot.

According to an example embodiment of the present invention, the aforementioned hybrid model may then be used in combination with or in conjunction with a control in order to operate the robot. In this case, the so-called impedance control may be applicable, for example. The impedance control (or compliance control) regulates the compliance of the system (here the robot), i.e., the link between force and position upon contact with an object (for example, between the robot and an obstacle). Compliance may be defined, for example, as the "measure of the robot capability of counteracting the contact forces." Passive and active approaches may be considered in this case. The compliance of the robot system in this case may be modeled as mechanical impedance, which describes the relationship between applied force and resulting velocity. In this case, for example, the manipulator of the robot may be considered to be a mechanical resistance with position limitations as a result of the surroundings. Accordingly, the causality of the mechanical impedance indicates that a movement of the robot results in a force.

The control or impedance control may take place, in particular, in the acceleration space, for example, where $$\ddot{q}_d := K_p(q_{ref} - q_m) + K_d(\dot{q}_{ref} - \dot{q}_m) + \ddot{q}_{ref}$$

In this case, $K_p$ indicates the stiffness of the connection points (joints) and $K_d$ their damping action, in each case as a matrix. Reference position or reference angle and reference velocity (corresponds to setpoint values) are identified with $q_{ref}$ and $\dot{q}_{ref}$, by contrast the corresponding measured or estimated values (for example, actual values) with $q_m$ and $\dot{q}_m$. The desired torque or setpoint torque $\tau^d$ for the actuators may then be calculated as follows:

$$\tau^d := \tau_H(q_m, \dot{q}_m, \ddot{q}^d)$$

In practice, $\dot{q}_m$ may be replaced in this case by filtered values or signals in order to avoid excessive noise and the in part relatively large influence thereof on the friction or on the compensation thereof. In addition, the control law for q̈$^d$ may be replaced by an impedance control law in the task space. The so-called task space is a general concept. A typical selection for a task space is, for example, the pose of the end effector (or manipulator) in Cartesian space.

In this way, i.e., by using such a hybrid model as provided herein, it is possible to configure the dynamics of the robot in such a way that a compliant and precise tracking is simultaneously enabled.

In addition to the use of such a model for the operation of the robot, the present invention also relates to a method for teaching (or training) the model. According to an example embodiment of the present invention, for this purpose, training data, in particular, measured data and/or simulation values, for the parameters are provided for the one or for the at least one of multiple connection points and for the torque for the respective actuator. The model is then adapted, i.e., taught, based on the training data and while optimizing the model, specifically, in particular, when using a cost function. At least the machine learning model is adapted or taught in the process. The adapted or taught model is then provided for later use. The adaptation or teaching of the model in this case means, in particular, that, for example, weights of neurons of the machine learning model are adapted. The aim of this teaching in this case is to represent as exactly as possible the robot and its connection points and their behavior using the entire model and, thus, in particular, also using the machine learning model.

Two variants are preferred for this teaching of the model. On the one hand, the rigid body model and/or the friction model, in addition to the machine learning model, may simultaneously also be adapted. On the other hand, however, also only the machine learning model may be adapted. The rigid body model and/or the friction model may then have been adapted, for example, beforehand, in particular, prior to the adaptation of the machine learning model.

To teach or to train the model, a non-linear least squares problem, for example, may be solved using the following cost function:

$$\min_\theta \frac{1}{T}\sum_{l=1}^{T}\|\tau_{m,i} - \tau_{RBD}(q_m, \dot{q}_m, \ddot{q}_m, \pi) - \tau_C(\dot{q}_m) - \tau_\epsilon(q_m, \dot{q}_m, \theta)\|^2$$

In this case, $\tau_\epsilon$ indicates the contribution of the machine learning model, which is parameterized by the weights θ; the index m refers to the measured data or to the mentioned measured values, which have been obtained, for example, in experiments with the physical robot. In addition, $\tau_C(\dot{q}_m)$ is a function of values $\sigma_C, \sigma_O, \sigma_V$.

To enable a continuous learning of the entire model, i.e., the optimization of all parameters of the hybrid model $\pi, \sigma_C, \sigma_O, \sigma_V$, and the weights of machine learning model θ or the neural network, it is expedient to use a parameterization that remains physically constant, even when consistency limitations are not explicitly taken into consideration. The problem to be solved then reads, for example:

$$\min_{\theta,\pi,\sigma*} \frac{1}{T}\sum_{l=1}^{T}\|\tau_{m,i} - \tau_{RBD}(q_m, \dot{q}_m, \ddot{q}_m, \pi) - \tau_C(\dot{q}_m, \sigma*) - \tau_\epsilon(q_m, \dot{q}_m, \theta)\|^2$$

In this case, the friction parameters are summarized by σ*. For the purpose of physical consistency, the following re-parameterization, in particular, is provided, in which the actual barycentric parameters for each connection point may be derived from matrix product $AA^T$ in accordance with the notation in Sousa, Cristóvao D., and Rui Cortesao; "Inertia tensor properties in robot dynamics identification: A linear matrix inequality approach;" IEEE/ASME Transactions on Mechatronics 24.1 (2019):406-411," in particular, equation (19):

$$A = \begin{bmatrix} a & 0 & 0 & 0 \\ e & b & 0 & 0 \\ f & g & c & 0 \\ h & i & j & d \end{bmatrix}$$

These parameters refer as follows to the inertia parameters of the rigid body dynamics parameters: initially the inertia of the component as it is perceived, for example, in the joint that connects two successive components:

$$L = \begin{bmatrix} L_{xx} & L_{xy} & L_{xz} \\ L_{yx} & L_{yy} & L_{yz} \\ L_{zx} & L_{zy} & L_{zz} \end{bmatrix} = \begin{bmatrix} e^2+b^2+f^2+g^2+c^2 & -ae & -af \\ -ae & a^2+f^2+g^2+c^2 & -ef-gb \\ -af & -ef-gb & a^2+e^2+b^2 \end{bmatrix}$$

then the initial moment of inertia of the component, the product of mass and of center of mass of the component:

$$l = \begin{bmatrix} l_x \\ l_y \\ l_z \end{bmatrix} = \begin{bmatrix} ah \\ ch+ib \\ fh+gi+cj \end{bmatrix}$$

and then the mass itself:

$$m = h^2 + i^2 + j^2 + d^2$$

It should be noted that the center of mass vector may be obtained by dividing the initial moment of inertia l by the mass m. Ultimately, optimization parameters π are replaced by the above parameters a through j for each component in the rigid body system. The above parameterization serves the condition of the positive definedness in order to ensure a complete physical consistency:

$$B = \begin{bmatrix} \frac{1}{2}(L_{yy}+L_{zz}-L_{xx}) & -L_{xy} & -L_{xz} & l_x \\ -L_{xy} & \frac{1}{2}(L_{xx}+L_{zz}-L_{yy}) & -L_{yz} & l_y \\ -L_{xz} & -L_{yz} & \frac{1}{2}(L_{xx}+L_{yy}-L_{zz}) & l_z \\ l_x & l_y & l_z & m \end{bmatrix} \geq 0$$

where $$B = AA^T$$

it is the case that for each selection of A, the matrix B is positively semi-definite and the physical consistency is thus ensured. It should be noted that the convexity of the adaptation problem is lost. In order to avoid a parameter set being found, which is in a local minimum, it is provided to initially determine the inertia and friction parameters by so-called "Semi-Definite Programming" (SDP). In this regard, reference is also made to Sousa, Cristóvao D., and Rui Cortesao; "Inertia tensor properties in robot dynamics identification: A linear matrix inequality approach;" IEEE/ASME Transactions on Mechatronics 24.1 (2019): 406-411. Accordingly, suitable values for a through j may be found for each component and these may be used as an initial estimation for the training phase of the model.

A system for data processing according to the present invention, for example, a computer or a control unit of a robot is configured, in particular, programmed, to carry out a method according to the present invention.

The present invention also relates to a robot that includes multiple components and one or multiple actuators. According to an example embodiment of the present invention, at least two components each of the robot being movable with the aid of an actuator relative to one another at a connection point. The robot is configured to provide values for the parameters and to obtain a value of the torque for the respective actuator, which has been determined according to a method described above and, based on the above, to operate the robot. The robot preferably also includes one or multiple sensors for detecting the values of the parameters, further preferably a control unit or regulating unit for activating the actuators, further preferably using a system according to the present invention.

The implementation of a method according to the present invention in the form of a computer program or computer program product including program code for carrying out all method steps is also advantageous, since this results in particularly low costs, in particular, if an executing control unit is also utilized for further tasks and is therefore present in any case. Finally, a machine-readable memory medium is provided, on which a computer program as described above is stored. Suitable memory media or data media for providing the computer program are, in particular, magnetic, optical and electrical memories such as, for example, hard disks, flash memories, EEPROMs, DVDs and the like. It is also possible to download a program from computer networks (Internet, Intranet etc.). Such a download in this case may takes place in a hardwired or wireless manner (for example, via a WLAN network, a 3G-, 4G-, 5G- or 6G-connection, etc.).

Further advantages and embodiments of the present invention result from the description and from the figures.

The present invention is schematically represented in the figures based on exemplary embodiments and is described below with reference to the figures.

DETAILED DESCRIPTION OF EXAMPLE EMBODIMENTS

Figure 1:
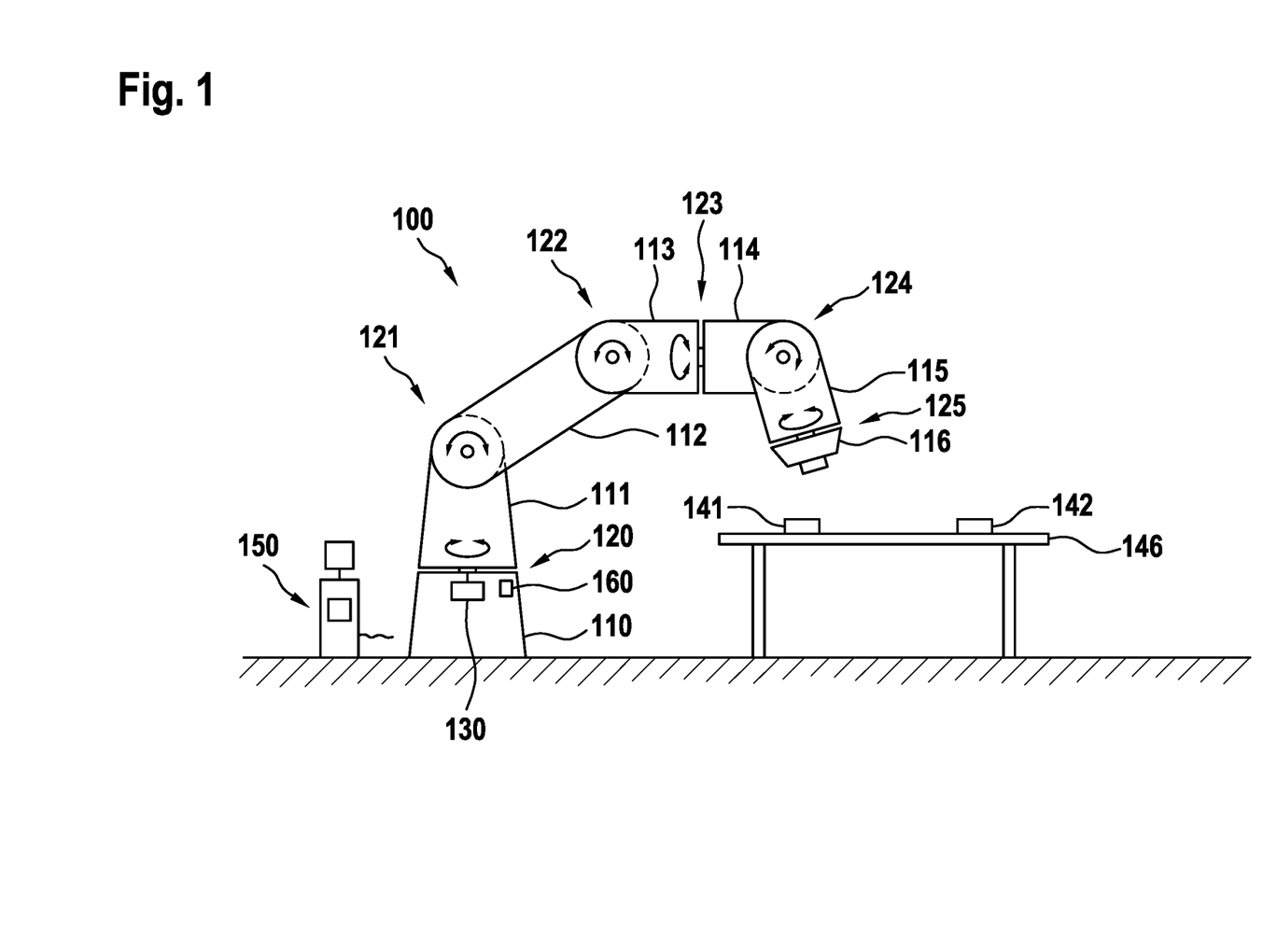
FIG. 1 schematically shows a robot, in which a method according to the present invention may be carried out.

In FIG. 1, a robot 100 is schematically represented, in which a method according to the present invention may be carried out. Robot 100 includes, for example, three components 110 through 116, two each of which are connected with the aid of a connection point 120 through 125, here a joint, in such a way that the two components are movable, in particular, rotatable, relative to one another. For example, joint 120 is provided between the two components 110 and 111. An actuator 130, for example, is also shown, which is configured to move the two components 110 and 111 relative to one another. Accordingly, one actuator may be provided for every other joint (not shown here).

A sensor 160, for example, is also shown, which is configured to detect the relative position or rotation of the two components 110 and 111 relative to one another. For this purpose, sensor 160 may, for example, output a value of an angle. Values for velocity and acceleration may also be determined or calculated based on the value of the angle. However, other sensors may also be provided for this purpose. Accordingly, a sensor (or multiple sensors) may be provided for every other joint (not shown here).

For example, robot 100 including component 110 is fastened on a subsurface or floor and component 116 is designed as a manipulator (end effector), with the aid of which, for example, objects 141 and 142 on table 140 are able to be picked up and moved. A system 150 for data processing, for example, a computer or a control unit, is also provided, with the aid of which, for example, the individual actuators and thus robot 100 may be activated and operated. Computer 150 may, for example, also include a control unit and/or regulating unit for activating the actuators. Such a control unit and/or regulating unit may, however, also be provided separately or may be integrated into robot 100.

As mentioned, it is desirable when operating such a robot to map parameters of the connection points as accurately as possible onto a torque for the respective actuator in order to ultimately be able to adjust the torque in such a way that a desired acceleration (setpoint value) is achieved. For this purpose, the use of a (hybrid) model within the scope of the present invention is provided; two preferred specific embodiments of models are explained below.

Figure 2:
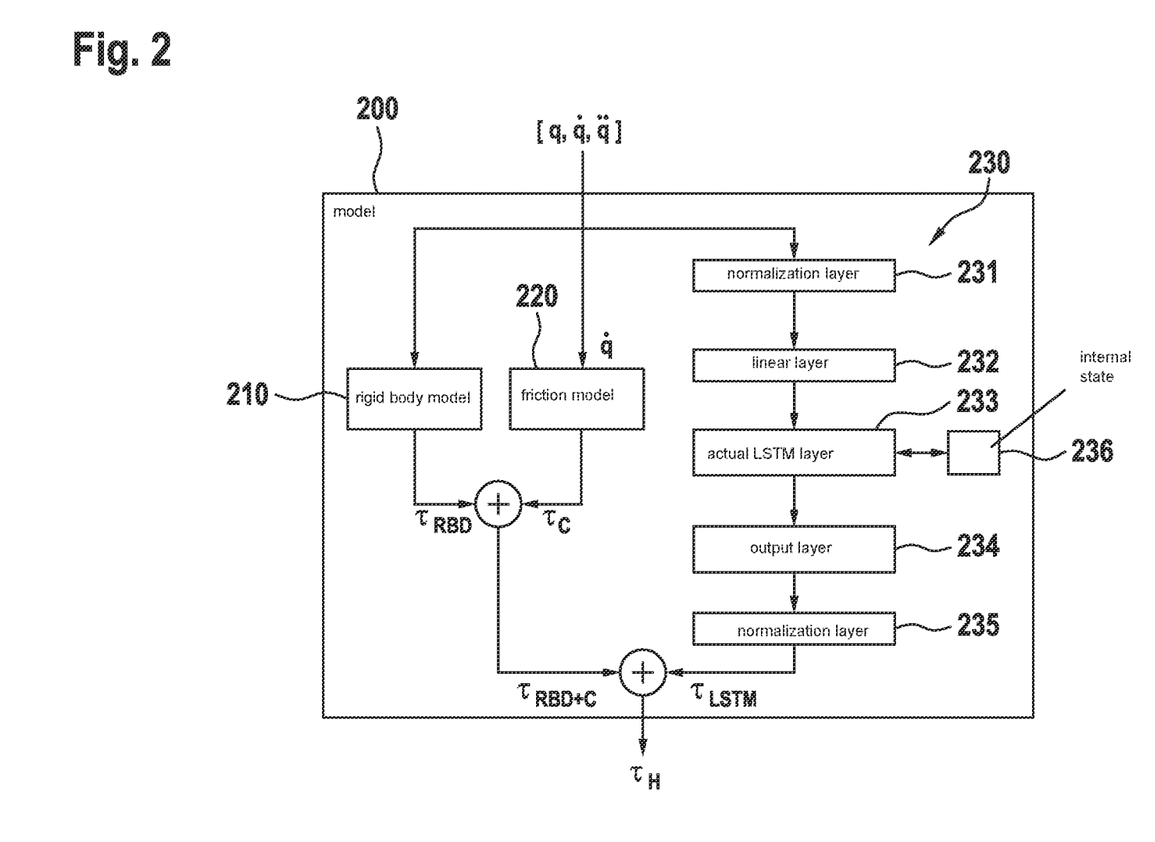
FIG. 2 schematically shows a model of a robot as it may be used in a method according to the present invention in a preferred specific embodiment.

A model 200 for a robot as it may be used in a method according to the present invention in one preferred specific embodiment is schematically represented in FIG. 2. Model 200 includes a rigid body model 210, a friction model 220, and a machine learning model 230.

Model 200 receives as input variables values for an angle q, a velocity $\dot{q}$, and an acceleration $\ddot{q}$, specifically, for each actuator or for the corresponding connection point (joint). Thus, q,$\dot{q}$,$\ddot{q}$ may be vectors including one entry each for each actuator or for each connection point.

Rigid body model 210 maps all three parameters q,$\dot{q}$,$\ddot{q}$ per actuator or joint onto a rigid body partial torque $\tau_{RBD}$ of the respective actuator. In this case, it is advantageous if the rigid body model is parameterized with the aid of barycentric parameters, as explained above. When using the model, it is thus possible to determine for instantaneous values or measured values of the three parameters, angle q, a velocity $\dot{q}$, and an acceleration $\ddot{q}$ a value for rigid body partial torque $\tau_{RBD}$, specifically, for each actuator.

Friction model 220 maps, for example, velocity $\dot{q}$ as a parameter onto a friction partial torque $\tau_C$ of the respective actuator. The friction model in this case may be based on a Coulomb friction coefficient and/or on a viscosity friction coefficient as explained above. Thus, when using the model, it is possible to determine for an instantaneous value or measured value of velocity $\dot{q}$ a value for friction partial torque $\tau_C$, specifically, for each actuator.

When using model 200, it is possible to initially add together the two partial torques, rigid body partial torque $\tau_{RBD}$ and friction partial torque $\tau_C$ determined or calculated with the aid of the two sub-models rigid body model 210 and friction model 220, in order to obtain an intermediate torque $\tau_{RBD+C}$.

Machine learning model 230 maps, for example, all three parameters $q,\dot{q},\ddot{q}$ per actuator or joint onto a machine learning partial torque $\tau_{LSTM}$ of the respective actuator. Machine learning model 230 is intended here to include, or be designed as, a recurrent neural network, specifically, an LSTM neural network, for example. Such LSTM neural networks are suitable, in particular, for dynamic systems such as a robot.

Accordingly, machine learning model 230 includes, in particular, multiple layers, namely an optional normalization layer 231, a linear layer 232, the actual LSTM layer 233, an output layer 234 (for example, also a linear layer), as well as a further optional normalization layer 235. LSTM layer 233 includes preferably an internal state 236, which may be represented by a bi-directional data exchange with a memory block.

First normalization layer 231 is used, in particular, to normalize the input data for the neural network using predefined values. A layer normalization may be used between the model layers. A layer normalization is used to reduce the covariance shift between training data set and test data set and to increase the training speed and generalization. Linear layer 232 is used, in particular, for learning latent features, LSTM layer 233 is used, in particular, for learning temporal features.

Linear layer 232 is then used, for example, to learn a set of features for LSTM layer 233 for each input state of the model. Within the individual LSTM cells, a hidden state is able to learn temporal patterns by using the update gate and forget gate within its cell. For each input sequence, the initially hidden state is initialized from a learned parameter. The LSTM outputs its instantaneous cell state (236 in FIG. 2) and its hidden state. The hidden state is processed by linear output layer 234 in order to calculate the torque or the residual torque rate for all joints, while the cell state is updated in each time step in order to learn temporal features in the sequence. The cell state is used as input for the next time step. The model is therefore able to learn temporal correlations within an input sequence.

Thus, with the aid of this machine learning model 230, components remaining and/or not discovered or considered, in particular, when using the other two sub-models, are covered.

When using model 200, it is then possible to also add together intermediate torque $\tau_{RBD+C}$ and machine learning partial torque $\tau_{LSTM}$ in order to obtain torque $\tau_H$ of the respective actuator or a value therefor. It is understood that the three partial torques may also otherwise be added together.

Figure 3:
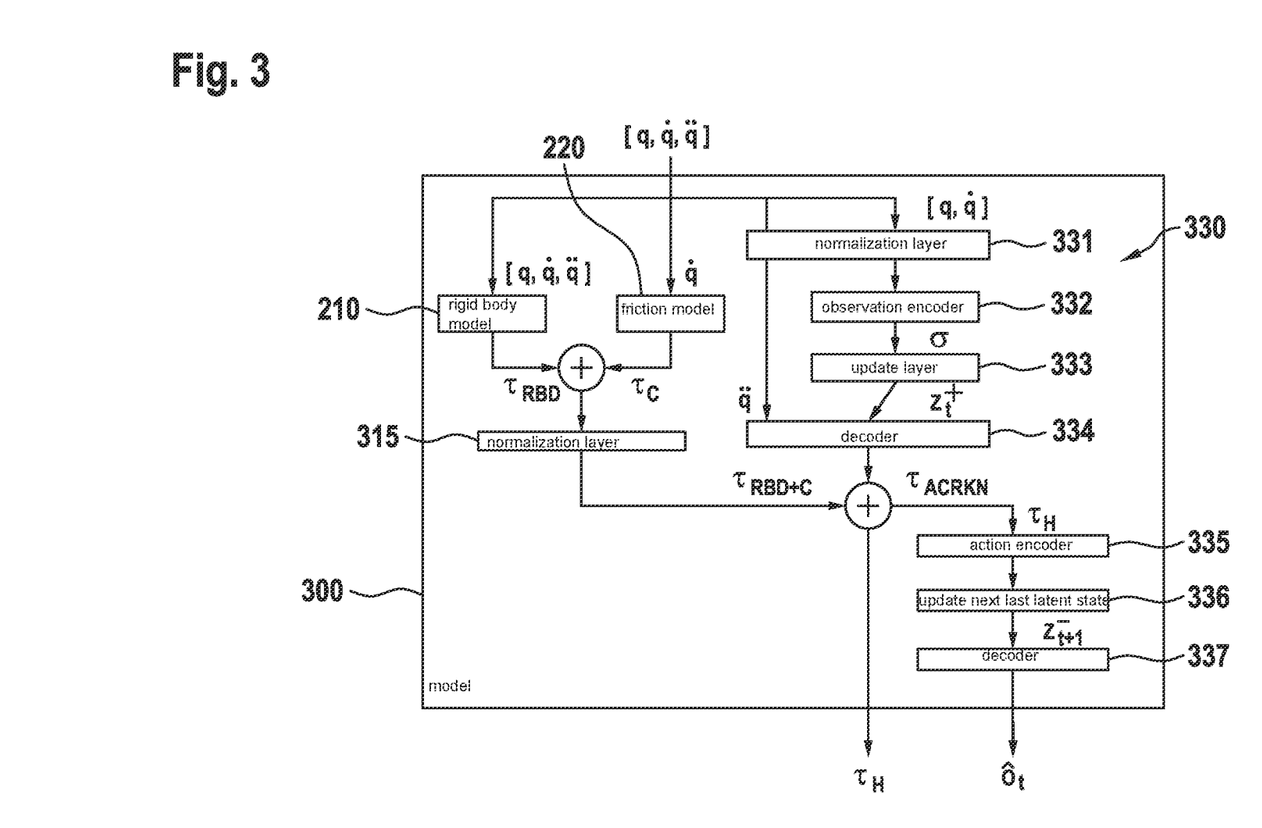
FIG. 3 schematically shows a model of a robot as it may be used in a method according to the present invention in a further preferred specific embodiment.

A model 300 for a robot as it may be used in a method according to the present invention in one further preferred specific embodiment is schematically represented in FIG. 3. Model 300 includes a rigid body model 210, a friction model 220, and a machine learning model 330.

Like model 200, model 300 receives as input variables values for an angle q, a velocity $\dot{q}$, and an acceleration $\ddot{q}$, specifically, for each actuator or for the corresponding connection point (joint). Thus, $q,\dot{q},\ddot{q}$ may be vectors including one entry each for each actuator or for each connection point.

Rigid body model 210 and friction model 220 correspond to those of model 200 from FIG. 2, so that reference may be made to the respective description. In addition, only one optional normalization layer 315 is provided here, which may be applied to the sum of rigid body partial torque $\tau_{RBD}$ and friction partial torque $\tau_C$ in order to thus obtain intermediate torque $\tau_{RBD+C}$.

Machine learning model 330 maps, for example, all three parameters $q,\dot{q},\ddot{q}$ per actuator or joint onto a machine learning partial torque $\tau_{ACRKN}$ of the respective actuator, the parameters being processed in part separately, however. Machine learning model 330 is intended here to include, or to be designed as, an action-conditional recurrent Kalman network. The basic principle of such a network is described in greater detail, for example, in Shaj, V., Becker, P., Buchler, D., Pandya, H., van Duijkeren, N., Taylor, C., Neumann, G. (2020); "Action-Conditional Recurrent Kalman Networks For Forward and Inverse Dynamics Learning;" Conference on Robot Learning. Virtual. This represents, for example, a general application of neural network architectures for modeling the robot dynamics without the inclusion of existing (First-Principle) models. Action-conditional recurrent Kalman networks (ACRKN) are a specific version of recurrent Kalman networks (RKN). They have a specific structure in order to include the causal dependencies of a controlled dynamic system.

For machine learning model 330 (ACRKN network), the input may be normalized (normalization layer 331) and divided into system state $q,\dot{q}$ and desired acceleration $\ddot{q}$. From an observation encoder 332, a value $\sigma$ is transferred to an update layer 333, where the last latent state is then updated, so that an instantaneous state $z_t^+$ is obtained. This is then transferred to a decoder 334 where, using the latter and the value of acceleration $\ddot{q}$, the machine learning partial torque $\tau_{ACRKN}$ is determined.

Intermediate torque $\tau_{RBD+C}$ and machine learning partial torque $\tau_{ACRKN}$ may, in particular, then also be added together in order to obtain torque $\tau_H$ of the respective actuator or a value therefor. It is understood that the three partial torques may also otherwise be added together.

In addition, however, machine learning model 330 receives torque $\tau_H$, it is transferred to an action encoder 335 where a latent action is added, for example via a control model, which knows the action to be carried out with the aid of the actuator. The next last latent state is then updated, so that an instantaneous state $z_{t+1}^+$ is obtained. In a decoder 337, a value $\hat{\sigma}_t$ is then determined, which is used in the next pass in update layer 333.

Figure 4:
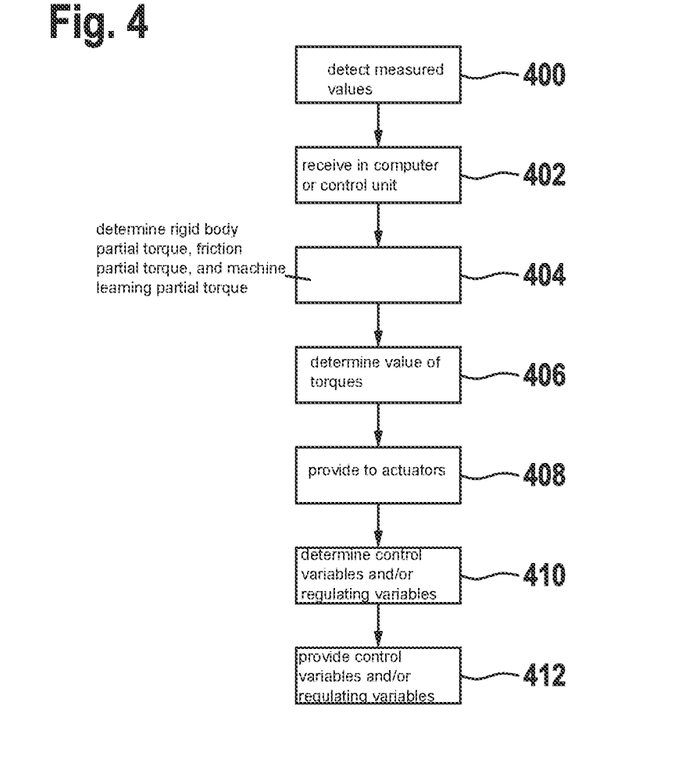
FIG. 4 schematically shows a sequence of a method according to the present invention in a further preferred specific embodiment.

A sequence of a method according to the present invention in one further preferred specific embodiment is represented in FIG. 4, specifically, an application of one of the described models, for example, in a control or regulation.

For this purpose, instantaneous values, in particular measured values, for angle, velocity and acceleration of the respective actuator are detected in a step 400 in a robot such as, for example, robot 100 according to FIG. 1, for example, including the sensors also mentioned with respect to FIG. 1. It is also possible that values for particular parameters are only calculated or derived. Thus, for example, angle and velocity may be directly measured, the acceleration may, for example, also be obtained from a control.

In a step 402, these values or measured values are then received in a computer or a control unit such as computer 150 according to FIG. 1. Based on these values or measured values and the model, for example, model 200 or 300 as explained above, one value each of the rigid body partial torque, of the friction partial torque and of the machine learning partial torque is then determined or calculated in a step 404. In a step 406, a value of the torque of the respective actuator in turn is determined based on the values of the rigid body partial torque, of the friction partial torque and the machine learning partial torque. In a step 408, this value of the torque is then provided for the respective actuator for use during operation of the robot.

In a step 410, control variables and/or regulating variables may additionally also be determined for the robot, specifically, based on values of the torque for the respective actuator. These control variables and/or regulating variables may then be provided in a step 412, in particular, transferred to a control unit and/or regulating unit for the actuators (this may also be computer 150 or a separate unit).

The detection of values or measured values mentioned as well as the determination of values of the acceleration (or optionally of the torque or of control variables and/or regulating variables) may take place, in particular, within the scope of a control, for example, of the aforementioned impedance control, so that the robot is able to be operated as desired. Accelerations may be determined, in particular, during operation. The inverse dynamics model then calculates the torque rate from the desired acceleration and from the measured angles/velocities.

Figure 5:
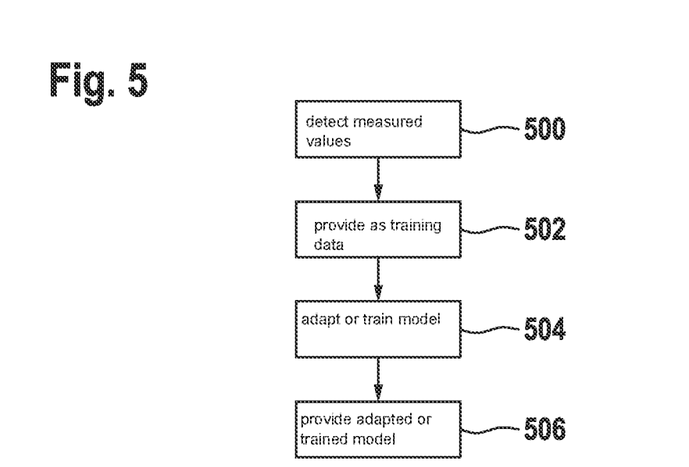
FIG. 5 schematically shows a sequence of a method according to the present invention in a further preferred specific embodiment.

A sequence of a method according to the present invention in one further preferred specific embodiment is schematically represented in FIG. 5, specifically, a teaching or training of one of the described models.

For this purpose, instantaneous values, in particular, measured values for angle, velocity and acceleration of the respective actuator are detected in a step 500 in a robot such as, for example, robot 100 according to FIG. 1, for example, including the sensors mentioned also with reference to FIG. 1. It is also possible that values for particular parameters are only calculated or derived. Thus, for example, angle and velocity may be directly measured, whereas the acceleration may be obtained, for example, by filtering from the velocity. In addition, associated reference values for the torque of the respective actuator are also determined; these may, for example, be setpoint values. These values are detected for many different situations or positions of the robot.

All these data are then provided as training data in a step 502. This is then followed in a step 504 by the adaptation or training of the model, for example, of model 200 or 300 as explained above. This adaptation takes place based on the training data while optimizing the model, in particular, when using a cost function as also already explained in greater detail above. Model parameters and/or weights of the model are adapted in the process.

Step 504 of adapting the model in this case may take place in various ways. The entire model including the rigid body model and a machine learning model as well as, optionally, the friction model may be trained as a whole. For this purpose, it is possible to resort to the aforementioned cost function and, in particular, to the specific representation of the barycentric parameters (cf. in this regard also the so-called Cholesky decomposition or Cholesky factor) for the rigid body model.

The adaptation of the model may, however, also take place in two steps, namely, initially a determination of the (barycentric) parameters for the rigid body model, and subsequently and separately therefrom, the adaption of the machine learning model. In the latter case, the previously determined parameterization of the rigid body model may then be used.

In a step 506, the adapted or taught model is then provided, so that it may be used for the operation of the robot as explained, for example, with respect to FIG. 4.

This combination of various sub-models makes it possible for the (hybrid) model to draw upon physical assumptions in order to improve a generalization of the model, and makes it possible to detect even only partially observable dynamic effects, for example, static friction and elasticities. In the process, the shared, continuous training of all parts of the hybrid model results, in particular, in improved online tracking results, as compared to the two-step approach, in which initially the rigid body model is learned and the machine learning model is then adapted to errors. Compared to the (pure) rigid body model, the hybrid approach shows an improved accuracy and an improved ability to generalize as compared to (pure) black box methods.

What is claimed is:

1. A method for determining a torque for an operation of a robot that includes multiple components using a model of the robot, the robot including one or multiple actuators, two components each of the robot being moveable, using an actuator, relative to one another at a connection point, and the model mapping parameters for the connection point or at least one of multiple connection points onto a torque for a respective actuator, the method comprising the following steps:

providing values for the parameters, the parameters including: a position or an angle of the respective actuator, a velocity of the respective actuator, and an acceleration of the respective actuator, the model including a rigid body model, a friction model, and a machine learning model, the rigid body model mapping at least one of the parameters onto a rigid body partial torque of the respective actuator, the friction model mapping at least one of the parameters onto a friction partial torque of the respective actuator, and the machine learning model mapping at least one of the parameters onto a machine learning partial torque of respective actuator;

determining a value for each of the rigid body partial torque, the friction body partial torque, and the machine learning partial torque based on the values of the parameters and on the model;

determining a value of the torque of the respective actuator based on the values of the rigid body partial torque, the friction partial torque, and the machine learning partial torque; and providing the value of the torque for the respective actuator for use during operation of a control or of a regulating of the robot.

2. The method as recited in claim 1, further comprising:

determining control variables and/or regulating variables for the robot based on values of the torque for the respective actuator; and providing the control variables and/or regulating variables for the operation of the robot.

3. A method for teaching a model for use during operation of a robot that includes multiple components, the robot including one or multiple actuators, two components each of the robot being movable, using an actuator, relative to one another at a connection point, and the model mapping parameters for the connection point or for at least one of multiple connection points onto a torque for the respective actuator, the method comprising the following steps:

providing training data including measured values and/or simulation values, for the parameters for the connection point or the at least one of multiple connection points and for the torque for the respective actuator, the parameters including: a position or an angle of the respective actuator, a velocity of the respective actuator, and an acceleration of the respective actuator, the model including a rigid body model, a friction model, and a machine learning model, the rigid body model mapping at least one of the parameters onto a rigid body partial torque of the respective actuator, the friction model mapping at least one of the parameters onto a friction partial torque of the respective actuator, and the machine learning model mapping at least one of the parameters onto a machine learning partial torque of the respective actuator;

adapting the model based on the training data, while optimizing the model using a cost function, at least the machine learning model being adapted;

providing the adapted model.

4. The method as recited in claim 3, wherein the machine learning model includes an artificial neural network, or a multi-layer neural network, or an LSTM neural network, or an action-conditional recurrent Kalman network.

5. The method as recited in claim 3, wherein the rigid body model is parameterized using barycentric parameters, the barycentric parameters including a zero order inertia parameter, a first order inertia parameter, and a second order inertia parameter.

6. The method as recited in claim 3, wherein the friction model is based on at least one of the following: a Coulomb friction coefficient, a viscosity friction coefficient.

7. The method as recited in claim 3, wherein when adapting the model, the rigid body model and/or the friction model is also adapted.

8. The method as recited in claim 7, wherein the rigid body model is parameterized using barycentric parameters, the barycentric parameters including a zero order inertia parameter, a first order inertia parameter, and a second order inertia parameter, and wherein the barycentric parameters of the rigid body model are parameterized using a positive, semi-definite matrix.

9. The method as recited in claim 3, wherein, when adapting the model, the rigid body model and/or the friction model is not adapted, and the rigid body model and/or the friction model having been adapted prior to the adaptation of the machine learning model.

10. The method as recited in claim 3, wherein the connection point or the at least one of the multiple connection points includes a joint.

11. A system configured to determine a torque for an operation of a robot that includes multiple components using a model of the robot, the robot including one or multiple actuators, two components each of the robot being moveable, using an actuator, relative to one another at a connection point, and the model mapping parameters for the connection point or at least one of multiple connection points onto a torque for a respective actuator, the system configured to:

provide values for the parameters, the parameters including: a position or an angle of the respective actuator, a velocity of the respective actuator, and an acceleration of the respective actuator, the model including a rigid body model, a friction model, and a machine learning model, the rigid body model mapping at least one of the parameters onto a rigid body partial torque of the respective actuator, the friction model mapping at least one of the parameters onto a friction partial torque of the respective actuator, and the machine learning model mapping at least one of the parameters onto a machine learning partial torque of respective actuator;

determine a value for each of the rigid body partial torque, the friction body partial torque, and the machine learning partial torque based on the values of the parameters and on the model;

determine a value of the torque of the respective actuator based on the values of the rigid body partial torque, the friction partial torque, and the machine learning partial torque; and provide the value of the torque for the respective actuator for use during operation of a control or of a regulating of the robot.

12. A robot, comprising:

multiple components and one or multiple actuators, two components each of the robot being movable, using an actuator, relative to one another at a connection point;

one or multiple sensors configured to detect values of parameters; and a control unit and/or regulating unit configured to activate the actuators, using a system configured to determine a torque for an operation of the robot using a model of the robot, the model mapping parameters for the connection point or at least one of multiple connection points onto a torque for a respective actuator, the system configured to:

provide the detected values of the parameters, the parameters including: a position or an angle of the respective actuator, a velocity of the respective actuator, and an acceleration of the respective actuator, the model including a rigid body model, a friction model, and a machine learning model, the rigid body model mapping at least one of the parameters onto a rigid body partial torque of the respective actuator, the friction model mapping at least one of the parameters onto a friction partial torque of the respective actuator, and the machine learning model mapping at least one of the parameters onto a machine learning partial torque of respective actuator;

determine a value for each of the rigid body partial torque, the friction body partial torque, and the machine learning partial torque based on the values of the parameters and on the model;

determine a value of the torque of the respective actuator based on the values of the rigid body partial torque, the friction partial torque, and the machine learning partial torque; and provide the value of the torque for the respective actuator for use during operation of a control or of a regulating of the robot.

13. A non-transitory computer-readable memory medium on which is stored a computer program for determining a torque for an operation of a robot that includes multiple components using a model of the robot, the robot including one or multiple actuators, two components each of the robot being moveable, using an actuator, relative to one another at a connection point, and the model mapping parameters for the connection point or at least one of multiple connection points onto a torque for a respective actuator, the computer program, when executed by a computer, causing the computer to perform the following steps:

providing values for the parameters, the parameters including: a position or an angle of the respective actuator, a velocity of the respective actuator, and an acceleration of the respective actuator, the model including a rigid body model, a friction model, and a machine learning model, the rigid body model mapping at least one of the parameters onto a rigid body partial torque of the respective actuator, the friction model mapping at least one of the parameters onto a friction partial torque of the respective actuator, and the machine learning model mapping at least one of the parameters onto a machine learning partial torque of respective actuator;

determining a value for each of the rigid body partial torque, the friction body partial torque, and the machine learning partial torque based on the values of the parameters and on the model;

determining a value of the torque of the respective actuator based on the values of the rigid body partial torque, the friction partial torque, and the machine learning partial torque; and providing the value of the torque for the respective actuator for use during operation of a control or of a regulating of the robot.

* * * * *